United States Patent [19]
Yokoyama

[11] Patent Number: 5,181,539
[45] Date of Patent: Jan. 26, 1993

[54] BALL VALVE

[75] Inventor: Ikuo Yokoyama, Nobeoka, Japan

[73] Assignee: Asahi Yukizai Kogyo Co., Ltd., Japan

[21] Appl. No.: 743,375

[22] PCT Filed: Dec. 18, 1990

[86] PCT No.: PCT/JP90/01651

§ 371 Date: Aug. 19, 1991

§ 102(e) Date: Aug. 19, 1991

[87] PCT Pub. No.: WO91/09243

PCT Pub. Date: Jun. 27, 1991

[30] Foreign Application Priority Data

Dec. 19, 1989 [JP] Japan .................. 1-327372
Jun. 6, 1990 [JP] Japan .................. 2-146336

[51] Int. Cl.⁵ ............................. F16K 5/06
[52] U.S. Cl. .................. 137/625.32; 137/238; 251/315
[58] Field of Search ............ 137/625.32, 238; 251/315

[56] References Cited

U.S. PATENT DOCUMENTS

| | | | |
|---|---|---|---|
| 3,134,405 | 5/1964 | White et al. .......... | 137/625.32 |
| 3,322,149 | 5/1967 | Haenky .......... | 137/625.32 X |
| 3,525,352 | 8/1970 | Jensen .......... | 137/238 |
| 3,542,337 | 11/1970 | Scaramucci . | |

FOREIGN PATENT DOCUMENTS

| | | |
|---|---|---|
| 0112977 | 7/1984 | European Pat. Off. . |
| 2266070 | 10/1975 | France . |
| 53-81436 | 7/1978 | Japan . |
| 59-101055 | 7/1984 | Japan . |
| 61-28918 | 8/1986 | Japan . |
| 2087517 | 5/1982 | United Kingdom . |

*Primary Examiner*—Arnold Rosenthal
*Attorney, Agent, or Firm*—Burns, Doane, Swecker & Mathis

[57] ABSTRACT

In a ball valve wherein the rotation of a ball (1) provided in a valve chest (8) opens and closes a valve, an orifice (4) is provided in a passage (3) of the ball, and communicating passages (5) connecting the upstream side of the orifice (4) with the valve chest (8) and communicating passages (6) connecting the downstream side of the orifice with the valve chest (8) are provided. The passage (3) provided in the ball (1) has a large aperture at one end (30) and a small aperture at the other end (31), the respective communicating passages (5) (6) are formed so as to communicate the passage (3) with the valve chest (8) when the valve is opened, and the aperture of the passage (32) whereat a seat carrier (11) of the small aperture side of the ball faces the ball is made substantially the same as the aperture of the small aperture side end (31) of the passage of the ball (1).

11 Claims, 10 Drawing Sheets

BALL VALVE

TECHNICAL FIELD

The present invention relates to a ball valve not having portions thereof at which liquids stagnate when the valve is opened, to thus prevent the breeding of bacteria therein.

BACKGROUND ART

Conventionally, in transport lines for liquids in the semiconductor industry, bio and medical industries, food industry, and other chemical industries, use has been made of ball valves comprised of balls provided in the valve chests and gripped by seat carriers fitted with seat rings, and pocket-less ball valves comprised of balls arranged rotatably in a casing formed with a spherical space inside so as not to form pockets therein.

In these conventional ball valves, when the valves were left open to pass the fluid therethrough for long periods, the connection between the space formed between the valve chest and the ball and the passage of the liquid is completely shut, whereby the liquid sealed in the space becomes completely dead (stagnant), and thus it becomes impossible to prevent a proliferation of bacteria, etc.

Further, a pocket-less ball valve has a large rotational torque, since substantially the entire ball surface serves as a sliding part, but to ensure a smooth operation thereof, the machining precision of the ball and the spherical space must be very strict. Further, from a micropoint of view, since sliding parts are used, when water enters therein it becomes impossible to prevent a proliferation of bacteria, etc.

Further, in the conventional ball valve, when the valve is closed, fluid flowing into the valve chest space stagnates, as it is closed off from the ambient atmosphere, and this sometimes causes problems. For example, in the semiconductor industry, hydrogen peroxide water is sometimes flushed through pipes to sterilize the insides of the pipes, but if the ball valve is closed after passing the fluid therethrough, the hydrogen peroxide water sealed in the valve chest is vaporized and the pressure in the valve chest rises, causing problems of cracks in the ball valve body and a breakage of the seat rings.

DISCLOSURE OF THE INVENTION

The present invention was made in consideration of how to resolve the above problems, and an object thereof is the provision of a ball valve which does not have any portions in which liquids can stagnate when the valve is opened, which has a small rotational torque of the valve, and which does not require a special machining precision.

A further object of the present invention is the provision of a ball valve in which absolutely no leakage of fluid occurs when the valve is closed, and no breakage of the ball valve due to stagnant fluid occurs when the valve is closed.

Therefore, according to the present invention, there is provided a ball valve wherein a rotation of a ball provided in a valve chest opens and closes a valve, characterized in that an orifice is provided in a passage of the ball valve and communicating portions are provided to connect the upstream and downstream sides of the orifice and the valve chest space.

According to a preferred embodiment of the present invention, the orifice is provided in the passage in the ball, and the communicating portions are provided upstream and downstream of the passage in the ball.

According to another preferred embodiment of the present invention, the orifice is provided downstream of the passage of the ball, a communicating hole is provided at the approximate center portion of the passage of the ball, which communicates with a groove wherein the flange portion of a stem is fitted, and communicating grooves are provided at the side and bottom portions of the flange, which grooves communicate with the valve chest space.

According to a further embodiment, the orifice is provided in the passage of the ball, the communicating portions positioned upstream of the orifice are provided in a union which is slidably fitted in a valve body, and the communicating portions positioned downstream of the same are provided downstream of the end of the passage of the ball.

According to a still another embodiment, the orifice is provided in the passage of a downstream side union slidably fitted in the valve body, the communicating portions positioned upstream of the orifice are provided upstream of the ed of the passage of the ball, and the communicating portions positioned downstream are provided in the above mentioned union.

Further, according to the present invention, there is provided a ball valve wherein a rotation of a ball provided in a valve chest opens and closes a valve, characterized in that a passage provided in said ball has a large aperture at one end thereof and a small aperture at the other end thereof, the large aperture side and the small aperture side of the ball being provided with communicating portions respectively by which a communication between the ball passage and a valve chest space is obtained when the valve is opened, and the aperture of the passage of a seat carrier, wherein the seat carrier at the small aperture side of the ball faces the ball is substantially the same as the aperture at the small aperture side end of the ball.

According to a preferred embodiment of the above present invention, the communicating portion provided at the large aperture side of the ball is formed so as to communicate with the passage of a seat carrier at the large aperture side when the valve is closed.

According to another preferred embodiment, the communicating portion provided at the small aperture side of the passage of the ball is formed so as to communicate with the passage of a seat carrier at the small aperture side when the valve is closed.

Note that the material used for the ball valve of the present invention may be a metal, plastics, or ceramics, and may have a construction such that the valve is turned on or off by the rotation of a ball and is sealed by seat rings provided upstream and downstream of the ball, and thus is not particular limited.

BEST MODE OF CARRYING OUT THE INVENTION

An explanation will now be made of embodiments of the present invention, with reference to the drawings.

Figure 1:
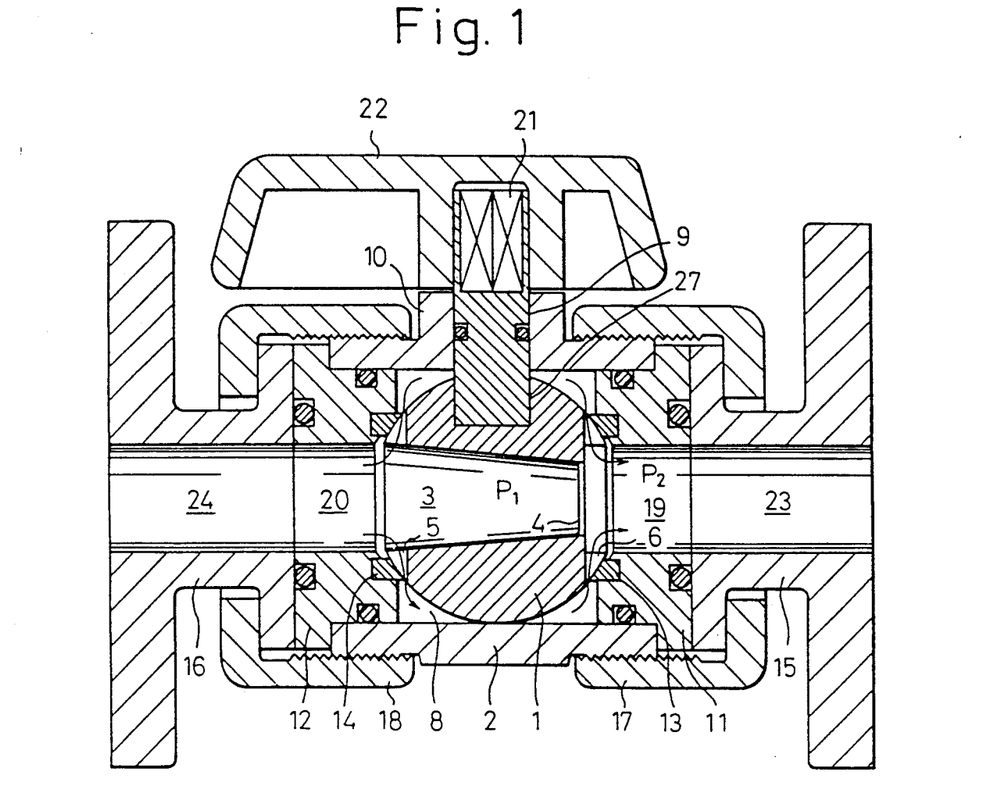
FIG. 1 is longitudinal section showing the fully opened state of an embodiment of a ball valve of the present invention.

FIG. 1 is a longitudinal section showing the open state of a polyvinyl chloride ball valve comprised of a valve body with unions slidingly fitted to the two ends thereof.

In the figure, 1 is a ball rotatably fitted in the valve chest of a cylindrical valve body 2, and downstream the passage 3 provided inside the same is provided a narrowed orifice 4. In FIG. 1, the orifice 4 is formed by narrowing the aperture of the passage 3 toward the downstream side thereof, but the orifice portion may be provided in a passage having the same size aperture throughout, and this is not particularly limit thereto. Note, in this case, a ring is fitted in the passage as to narrow that portion and form the orifice 4. The position of the orifice 4 provided in the passage 3 is not limited to the downstream side of the passage 3 and may be at the center or at the upstream side.

Figure 2:
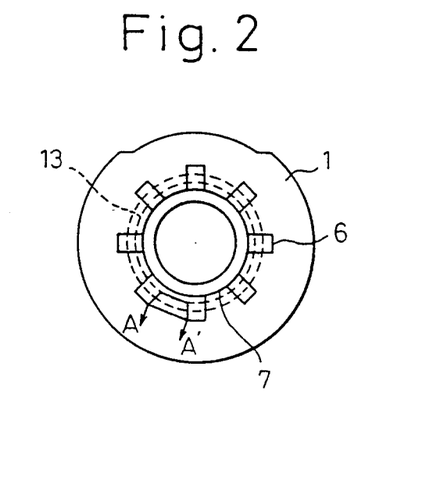
FIG. 2 is a right side view of the ball in FIG. 1.
Figure 3:
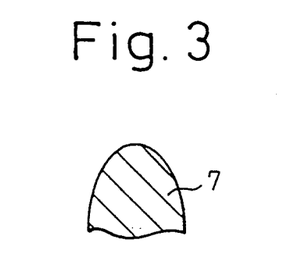
FIG. 3 is a sectional view of a separating wall taken along the line A—A' in FIG. 2.

Reference numerals 5 and 6 are communicating portions provided at the upstream end and the downstream end of the passage 3 about the orifice 4, i.e., at the inlet passage portion and the outlet passage portion, to connect the passage 3 and the valve chest space 8. The communicating portions 5 and 6, as shown in FIG. 2, are provided as a plurality of grooves (in the figure, 8) radially extending in the circumferential direction of the passage 3. The sectional shape of the separating walls 7 between the grooves is, as shown in FIG. 3, a protruding curve, and thus an optimum result is obtained by bringing them into tangential contact with the later-mentioned seat rings 13 and 14. Further, the length of the communicating portions 5 and 6 in the radial direction on the spherical surface of the ball 1 is within a range not obstructing the sealing action during valve closure, and must be set to be larger than the effective seal aperture (shown by the dotted lines in FIG. 2) of the later-mentioned seat rings 13 and 14.

The communicating portions 5 and 6 must each be provided at both the upstream side and downstream side of the orifice 4, as if they are not, the characteristic action of the present invention explained later is not obtained. The cylindrical valve body 2 is provided at an approximate center portion thereof with a head portion 10 having an opening 9 in a direction perpendicular to the axial line. A stem 21 fitted with a handle 22 is supported in the opening 9, and a ball 1 fitted to the bottom of the stem 21 is rotatably held in the valve chest.

Reference numerals 11 and 12 are unions slindingly fitted from the two sides of the cylindrical valve body 2. The inner circumferential side faces facing the ball 1 are fitted with seat rings 13 and 14 which come into contact with the ball 1 and have a sealing action. Reference numerals 15 and 16 are flanged body caps. By screwing the cap nuts 17 and 18 engaged with the same to the outer circumferential side faces of the cylindrical valve body 2, they are fixed to the unions 11 and 12 through the seat rings. The unions 11 and 12 and the flanged cap bodies 15 and 16 are provided with the passages 19, 20 and 23, 24, which form a continuous passage communicating the fluid when the valve is opened.

The embodiment as constructed above operates as follows. The fluid which passes through the inlet passages 24 and 20 and reaches the passage 3 of the ball 1, passes through the orifice 4 and flows out to the outlet passages 19 and 23. Due to the action of the orifice 4, a pressure differential of the fluid is created at the upstream side and downstream side. That is, the upstream side pressure $P_1$ of the orifice 4 becomes larger than the downstream side pressure $P_2$. As a result, part of the fluid flowing into the passage 3 passes through the upstream side communicating portions 5 of the ball 1 and flows into the valve chest space 8 of the cylindrical valve body 2. Further, the fluid fills the valve chest space 8 and reaches near the communicating portions 6 provided at the downstream portion of the orifice 4, but the communicating portions 6 communicate with the passage 3 of the ball 1 at the downstream side, and thus due to the above-mentioned pressure differential, the fluid is forcibly passed through the communicating passages 6, passes through the passage 3 and flows out to the outlet passages 19 and 23.

As explained above, while the valve is open, the fluid uninterruptedly flows in substantially all of the space in the ball valve, without stagnating, and continuously flows out to the outlet passage.

Figure 4:
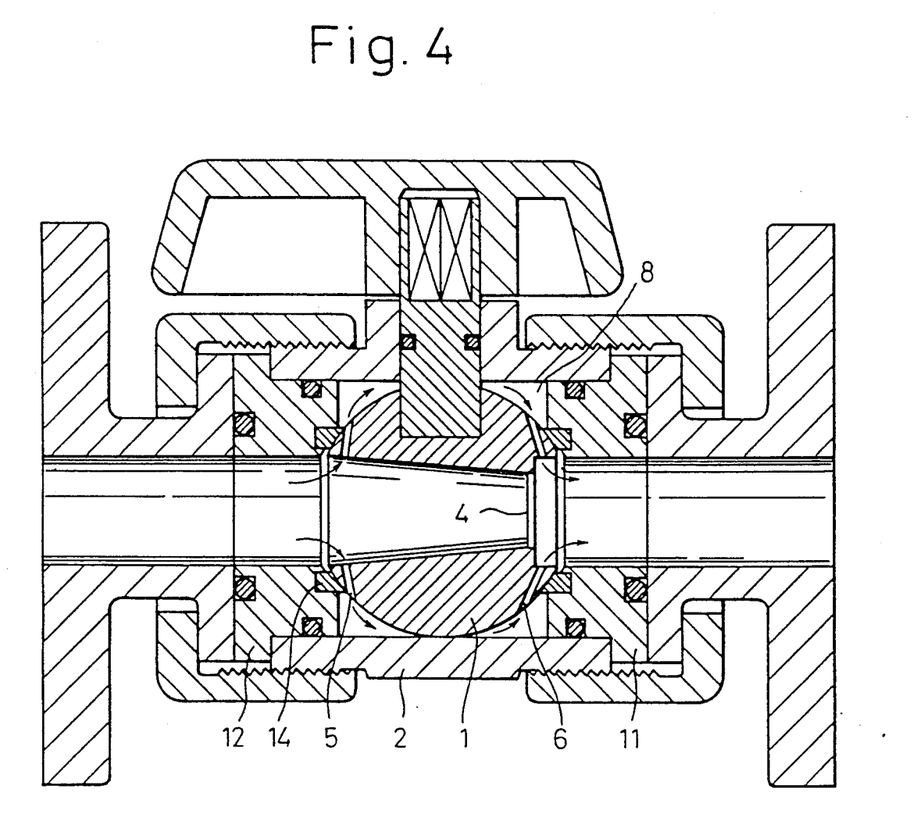
FIG. 4 is a front longitudinal section of a second embodiment wherein the communicating portions of the ball in FIG. 1 are holes.
Figure 5:
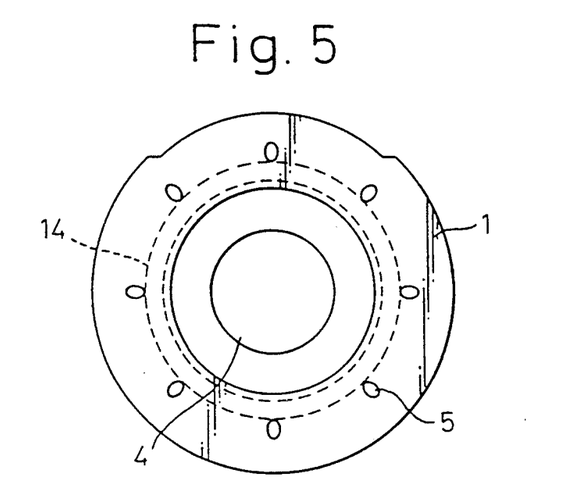
FIG. 5 is a left side view of the ball in FIG. 4.
Figure 6:
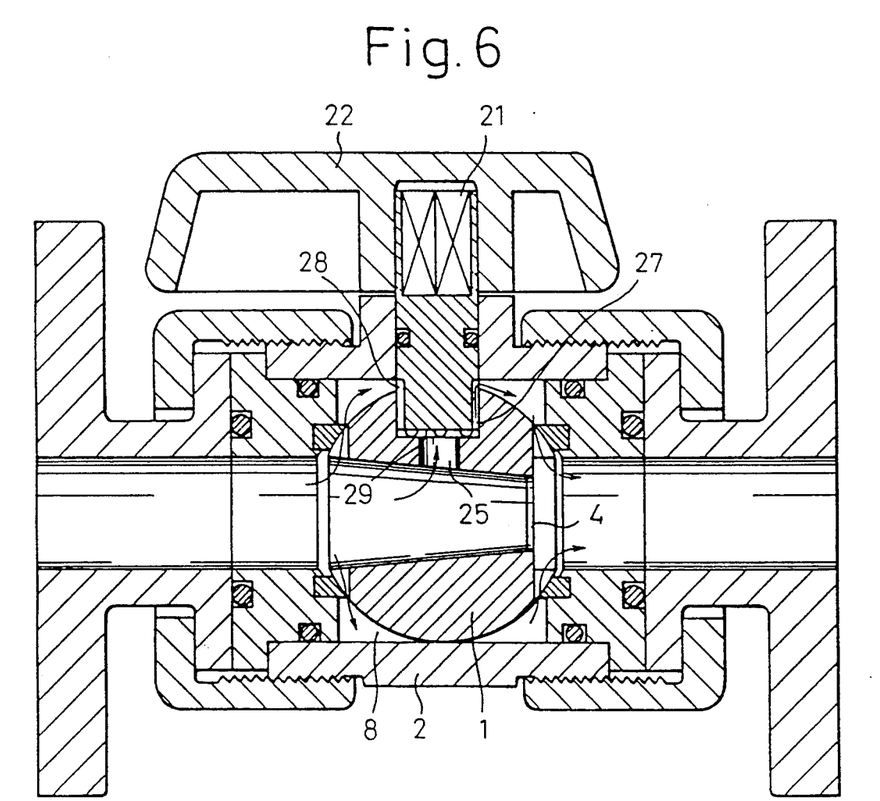
FIG. 6 is a front longitudinal section of a third embodiment.

FIG. 4 is a longitudinal section view which is the same as FIG. 1 but shows another embodiment wherein the communicating portions 5 and 6 in FIG. 1 are formed as holes. Further, FIG. 5 is a left side view of the ball 1 in FIG. 4.

The flow of the fluid in this embodiment is the same as in the case of the embodiment of FIG. 1, and thus an explanation thereof will be omitted.

FIGS. 6 to 9 show a third embodiment wherein a further improvement is made to the ball 1 and the stem 21 in FIG. 1.

In the figures, 25 is a communicating hole provided at the approximate center portion of the passage 3 of the ball 1 and communicating with the groove 27 wherein the flange portion 26 of the stem 21 is fitted.

Figure 7:
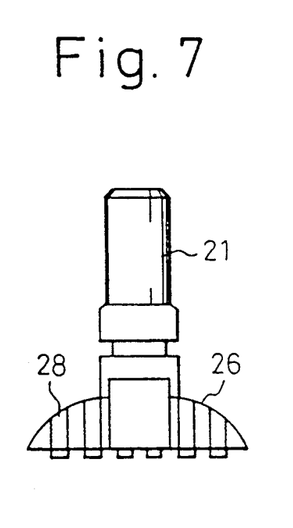
FIGS. 7 to 9 are a front view, side view, and bottom view of the stem in FIG. 6; respectively.
Figure 8:
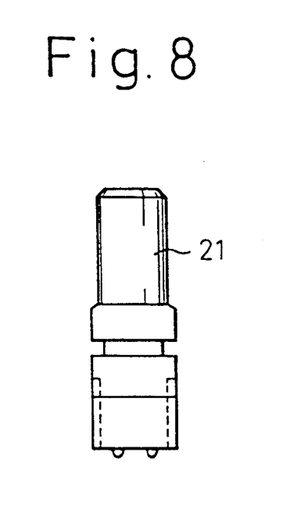
Figure 9:
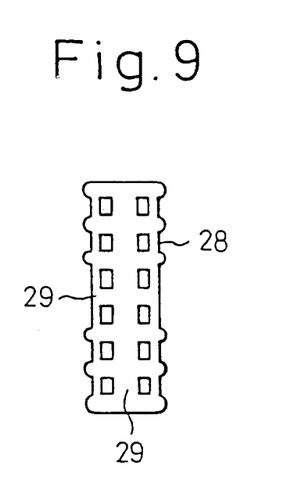

The flange portion 26, as shown in FIG. 7, is provided in a T-shape at the bottom of the stem 21. At the side face portion there are provided a plurality of communicating grooves 28 parallel to the axial line of the stem 1 and communicating with the valve chest space 8. Further, the bottom portion is also similarly provided with communicating grooves 29 running longitudinally and laterally. If the separating walls defining these communicating grooves are given substantially semicircular sectional shapes, a superior effect can be obtained.

The flow of the fluid in the present embodiment gives rise to the following flow in addition to the above-mentioned flow. That is, part of the fluid flowing into the passage 3 of the ball 1 passes through the communicating hole 25 to flow into the grooves 27, and further, passes through the communicating grooves 29 and 28 provided in the flange portion 26 of the stem 21 to flow out into the valve chest space 8. The subsequent flow is the same as mentioned above. Accordingly, the fluid stagnating in the small clearance at the joining portion of the stem and the ball, which was a problem in the prior art ball valve, continuously moves and flows to the downstream side in this embodiment when the valve is open, whereby the problem of the prior art is solved.

Figure 10:
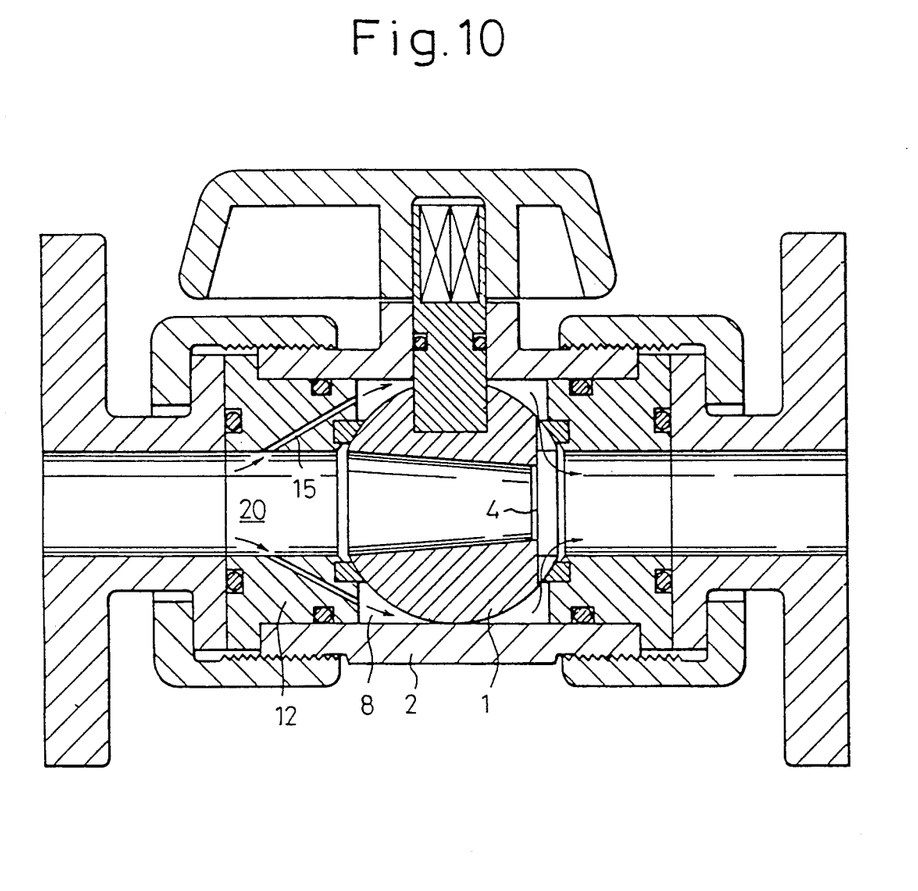
FIG. 10 is a front longitudinal section of a fourth embodiment.

FIG. 10 is a longitudinal section showing a fourth embodiment. This embodiment has the communicating portion 5 at the upstream side of the orifice 4 provided in the union 12 and the passage 20 of the union 12 and the valve chest space 8 communicated with each other. The mode of operation is the same as mentioned above, and thus an explanation thereof will be omitted.

Figure 11:
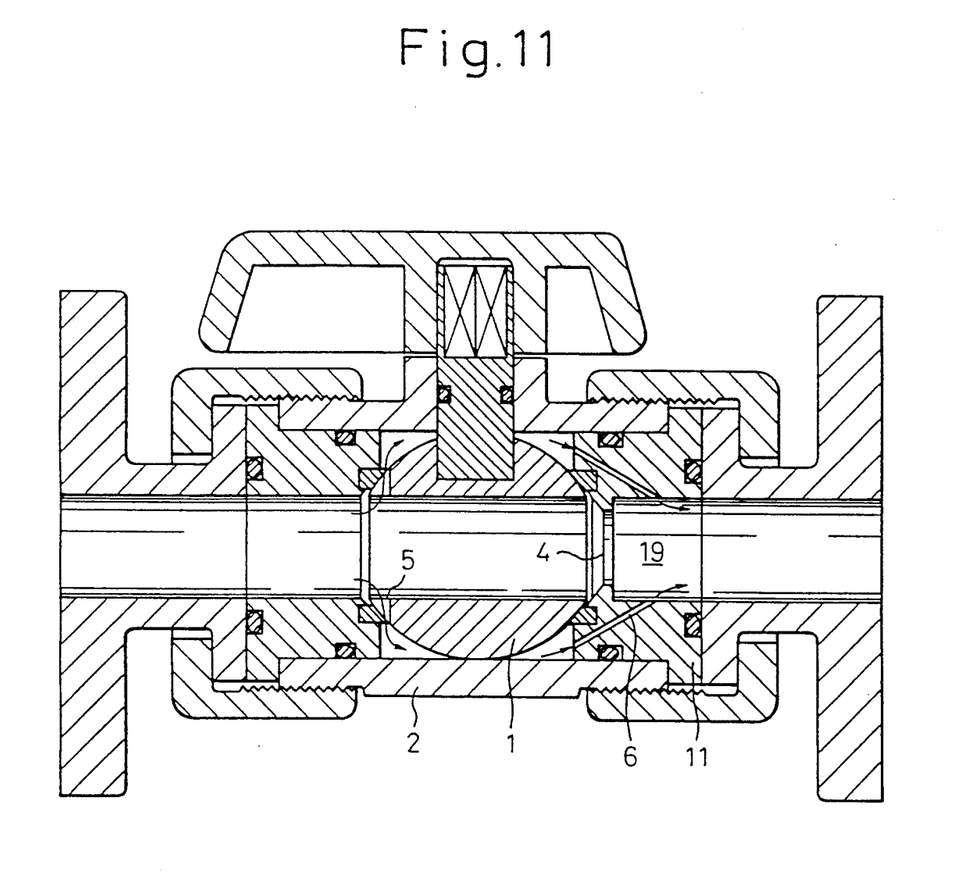
FIG. 11 is a front longitudinal section of a fifth embodiment.

FIG. 11 is a longitudinal section showing a fifth embodiment. The embodiment has an orifice 4 provided in the passage 19 of the union 11 and the communicating portion 6 of the downstream side of the orifice 4 provided in the union 11 as well. The mode of operation is the same as mentioned above, and thus an explanation thereof will be omitted.

Figure 12:
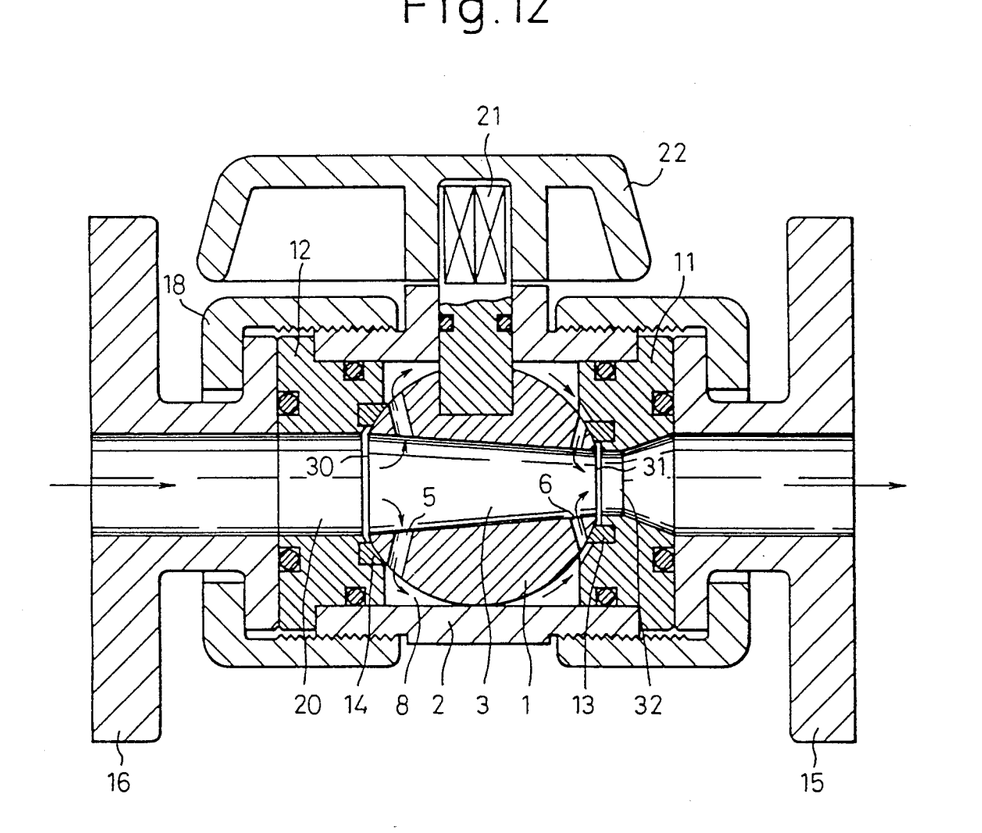
FIG. 12 is a longitudinal section of a sixth embodiment of the present invention, showing the fully opened state thereof.

FIG. 12 shows a sixth embodiment of the present invention.

Inside a ball 1 rotatably fitted in the valve chest of a cylindrical valve body 2, is formed a passage 3 with a sectional horizontal trapezoidal shape, the aperture of which is constricted toward the downstream side, and is provided with one end 30 (hereinafter referred to as an upstream end as it is upstream in the figure) having a large aperture and another end 31 (hereinafter referred to as a downstream end as it is downstream in the figure) having a small aperture. Near the upstream end 30 and the downstream end 31 are provided eight communicating holes 6 and 7 each connecting the passage 3 and the valve chest space 8 (see FIG. 5). The apertures and numbers of the communicating holes 5 and 6 may be designed in consideration of the strength of the ball material and are not particularly limited.

The positions of the communicating holes 5 and 6 are not particularly limited, but preferably, as shown in FIG. 5, are provided radially at the outside of the seat rings 13 and 14 held by the seat carriers (hereinafter referred to as the unions in this embodiment).

Note that the communicating portions are holes in the present embodiment, but these portions may be grooves.

When the valve is open, the fluid flows through the passage 3 of the ball 1, but as shown by the arrow, part passes through the upstream side communicating holes 5 and through the valve chest space 8 on to the downstream portion communicating holes 6 to flow in the direction of the passage 32 of the union 11. Therefore, in the valve chest space 8, when the valve is opened, fluid is continuously flushed to the downstream side, and thus there is no stagnation of the fluid. In the present embodiment, in the passage provided in the union 12 positioned at the downstream side, the aperture of the passage 32 at the side facing the ball 1 has the same size aperture as the small aperture end of the ball 1.

Figure 13:
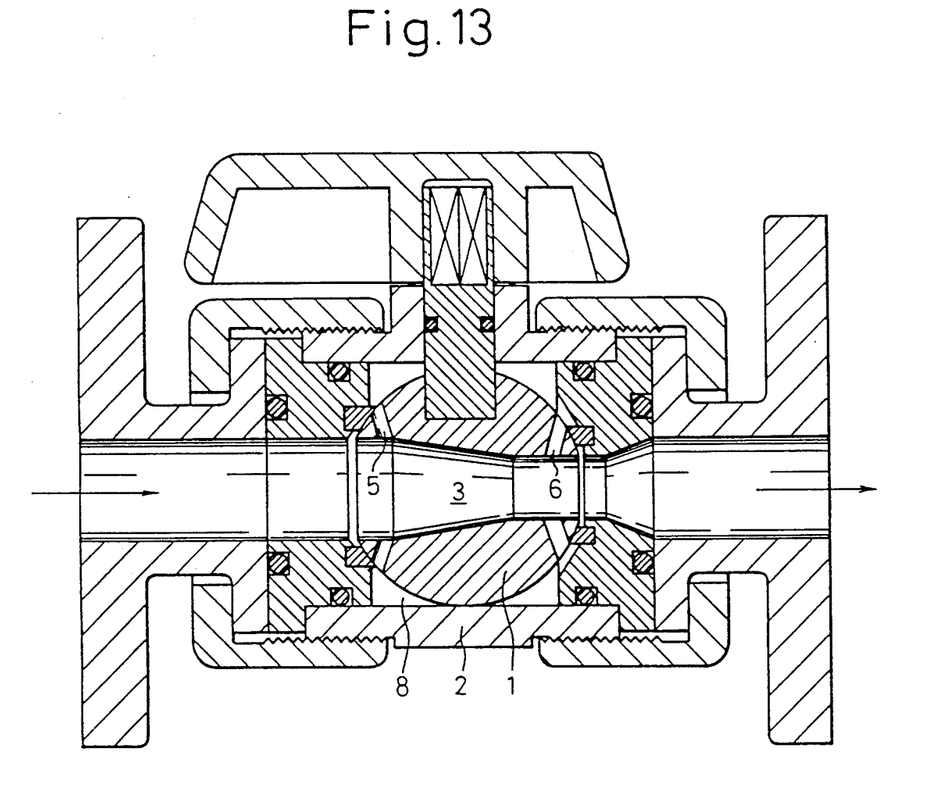
FIG. 13 is a front longitudinal section showing a seventh embodiment, which is a modification of FIG. 12.

FIG. 13 is a longitudinal section showing a seventh embodiment of the ball valve in the present invention. The embodiment is a modification of FIG. 12 and differs from FIG. 12 in the sectional shape of the passage 3 provided in the ball 1. The upstream side has a large aperture and the downstream side has a small aperture. Note, the large and small aperture sides are rectangular and the intermediate portion connecting both sides is a trapezoid, i.e., the shape of the portion there between is changed from a parallel passage to a tapered passage to a parallel passage.

Figure 14:
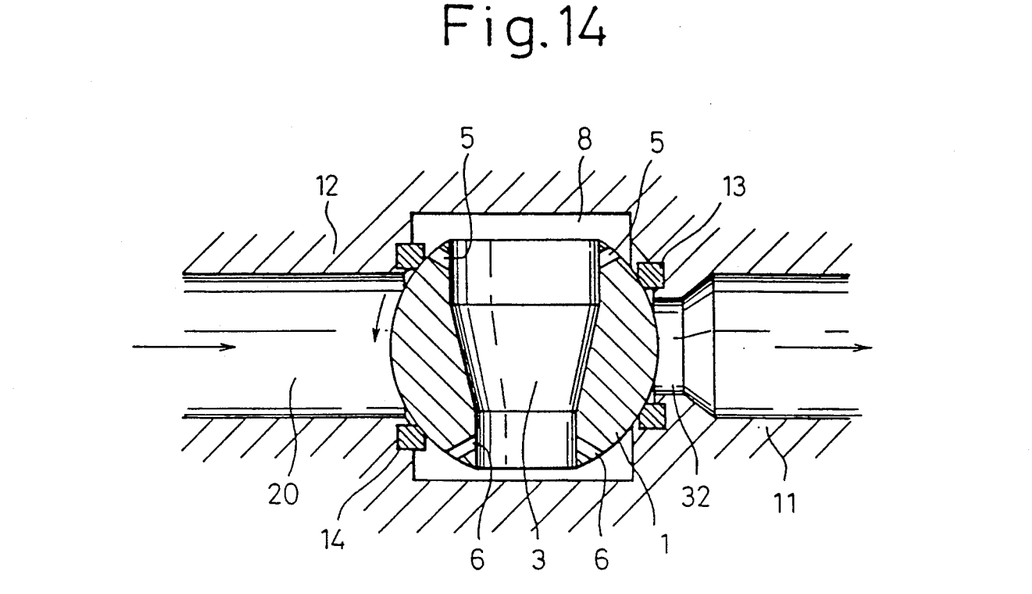
FIGS. 14 and 15 are lateral plane sections centered on the ball in the closed state of the ball valve shown in FIG. 13.
Figure 15:
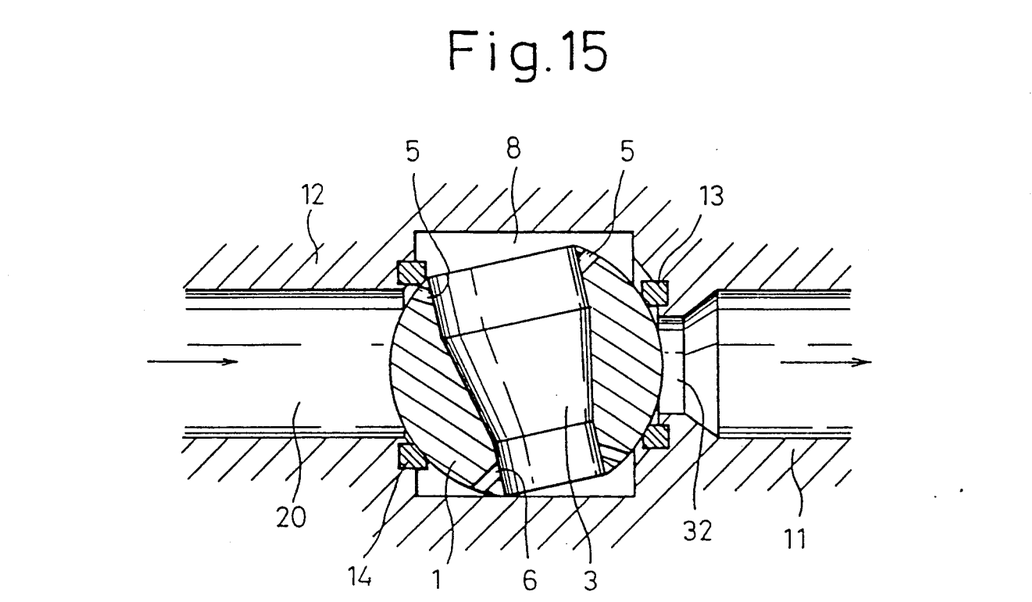

FIG. 14 and FIG. 15 are lateral plane sections of key portions centered on the ball in the closed state of the ball valve shown in FIG. 13. For example, even in the case of a transition from the state of FIG. 14 to the state of FIG. 15 i.e., when the ball 1 rotates and moves slightly to the left and the communicating hole 5 positioned at the upstream side communicates with the inner side of the seat ring 14 of the union 12, the communicating hole 5 at the downstream side is positioned at the outside of the seat ring 13 of the downstream side union 11, and thus does not communicate with the passage 32 of the union 11, whereby a leakage of the fluid is prevented by the seat ring 13.

Figure 16:
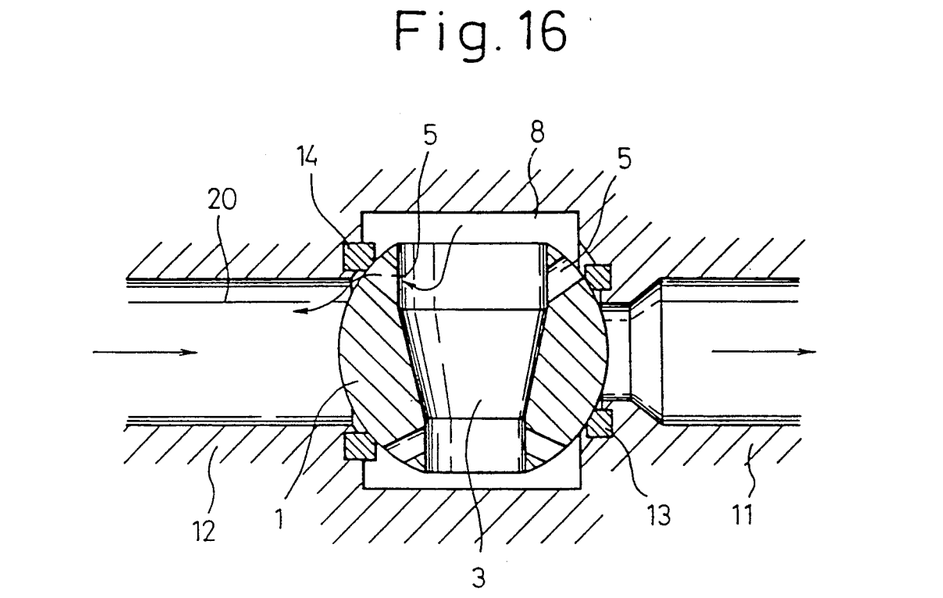
FIG. 16 is a lateral plane section centered on a modification of a ball of FIG. 14.

FIG. 16 is a lateral section of key portions showing a modification of FIG. 14. The difference of this embodiment from the embodiment of FIG. 14 is that the communicating hole 5 positioned at the upstream side of the ball 1 opens to the inside of the seat ring 14 mounted to the union 12 when the valve is normally opened. That is, it is provided so as to communicate the valve chest space 8 with the passage 20 of the union 12. For example, if the fluid is a volatile fluid, when the valve is closed, even if the gaseous pressure of the fluid stagnant in the valve chest space and the ball passage rises, the fluid can flow through the communicating hole 5 to the passage 20 of the upstream side union 12 as shown by the arrow, and thus it is possible to prevent the occurrence of cracks in the valve body due to a rise of the fluid pressure in the closed state, as in the past. Further, even in this state, the aperture of the downstream side union 11 is set to be smaller than the aperture at the upstream side, so the inner aperture of the seat ring 13 is smaller than that of the seat ring 14 and the communicating hole 5 at the downstream side becomes positioned at the outside of the seat ring 13, and the seal is held at the downstream side.

Therefore, even if the valve chest space 8 and the passage 20 of the upstream side union 12 are communicated at the upstream side, no problem of a leakage of fluid of the ball valve itself occurs.

Figure 17:
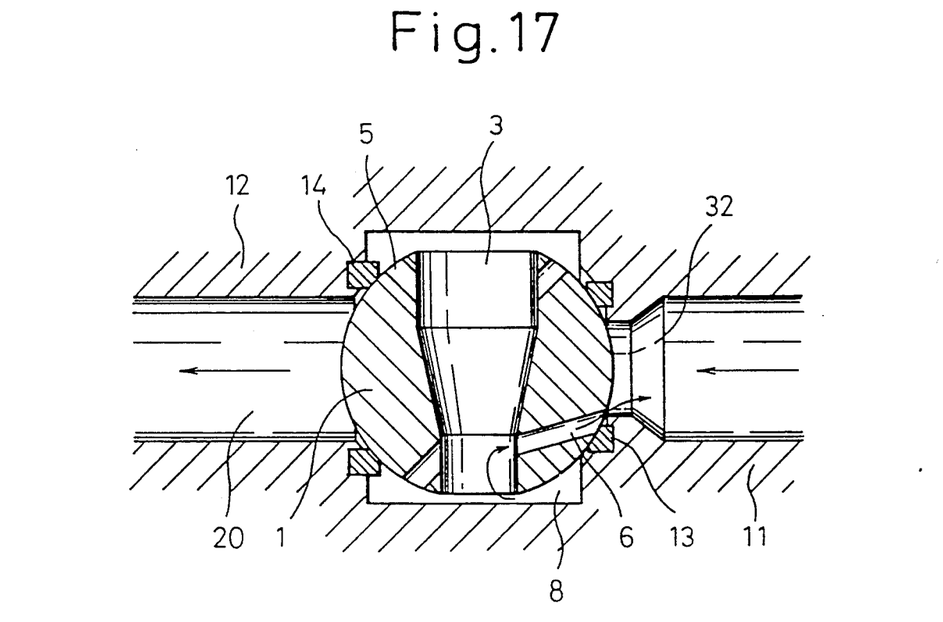
FIG. 17 is a lateral plane section centered on a modification of a ball of FIG. 16.

FIG. 17 is a lateral section view of key portions showing a modification of FIG. 16. In the present embodiment, the direction of the fluid flow is opposite to that in the embodiment of FIG. 16, and a part of the communicating hole 6 is opened inside the seat ring 13 mounted on the union 11 when the valve is closed, whereby the valve chest space 8 is communicated with the passage 32 of the union 11.

The mode of operation of the present embodiment is the same as that of the embodiment of FIG. 16, and thus explanation thereof will be omitted.

The present inventor manufactured a ball valve of the construction shown in FIG. 13, from a transparent acrylic resin, and passed water containing bubbles under the following conditions, to check the state of the flow of the water in the valve chest space when the valve is opened.

Conditions

1. Ball
Upstream side aperture: 25φ
Downstream side aperture: 15φ
Communicating holes: 8 of 3φ both upstream and downstream
2. Water
Water temperature: 25° C.
Water passed: 0 to 40 l/min
Water pressure: 1.5 l kgf/cm²

As a result, the existence of a secondary flow wherein water containing bubbles, together with the main flow passing through the ball passage, passes through the communicating hole of the upstream side of the ball, flows through the valve chest space, passes through the downstream side communicating hole, and flows out to the downstream side union passage, is clearly confirmed. That is, it is possible to verify that, when the valve is opened, the water flowing into the valve chest space continuously flows without stagnating.

The ball valve according to the present invention has the following advantages.

(1) When the valve is opened, the ball passage and the valve chest space are communicated with each other, so there is no stagnation of the fluid in the valve chest space and it is possible to prevent a proliferation of bacteria.

(2) When the valve is closed, even if some displacement of the ball results in a movement of the communicating portions provided in the ball and communication of the valve chest space with the passage in the union or other seat carriers, the seal can be ensured by the seat ring of the seat carrier having a small aperture passage, and thus there is no fear of a leakage of fluid.

(3) If the communicating portion provided at the upstream side of the ball is set to communicate with the passage of the upstream side seat carrier when the valve is closed, even if the gaseous pressure of the volatile liquid stagnated in the valve chest space rises, the gas passes through the communicating portions of the ball and can flow out to the passage of the upstream side seat carrier, and thus it is possible to avoid the situation as in the past where the gaseous pressure rises due to the closed state, and as a result, cracks occur in the valve body (in particular, plastic valves, etc.)

CAPABILITY OF EXPLOITATION IN INDUSTRY

The present invention is preferably applicable for the semiconductor industry, bio and medical industries, food industry, and other chemical industries.

I claim:

1. A ball valve comprising:
a valve body having a valve chest space between an upstream and a downsteam side of the valve body;
a ball having a passage therethrough, the ball being rotatably fitted in the valve chest space so that an upstream and a downstream end of the passage are communicable with the upstream and downstream sides of the valve body, the ball being formed with a ball groove for receiving a stem flange;
an orifice provided at the downstream end of the passage in the ball; and
a stem flange, the stem flange being fitted in the ball groove and forming, with the ball groove, a flange groove,
an upstream communicating portion being provided upstream from the orifice at the upstream end of the passage and communicating with the passage and the valve chest space, a downstream communicating portion being provided downstream from the orifice at the downstream end of the passage and communicating with the passage and the valve chest space, and a communicating hole being provided at an approximate center portion of the passage in the ball and communicating with the valve chest space through the flange groove.

2. A ball valve comprising:
a valve body having a valve chest space between an upstream and a downstream side of the valve body;
a ball having a passage therethrough, the ball being rotatably fitted in the valve chest space;
a union fitted in the valve body between the upstream side of the valve body and the ball and having a union passage; and
an orifice provided in the passage of the ball,
an upstream communicating portion being provided in the union and communicating with the union passage and the valve chest space, and a downstream communicating portion being provided at the downstream end of the passage of the ball and communicating with the passage of the ball and the valve chest space.

3. A ball valve comprising:
a valve body having a valve chest space between an upstream and a downstream side of the valve body;
a ball having a passage therethrough, the ball being rotatably fitted in the valve chest space;
a union fitted in the valve body between the downstream side of the valve body and the ball and having a union passage, the union having an upstream and a downstream end; and
an orifice provided in the union between the upstream and the downstream ends of the union,
an upstream communicating portion being provided on the upstream end of the passage of the ball and communicating with the passage of the ball and the valve chest space, and a downstream communicating portion being provided in the downstream end of the union and communicating with the passage of the union and the valve chest space.

4. A ball valve comprising:
a valve body having a valve chest space between two sides of the valve body;
a ball having a passage therethrough, the ball being rotatably fitted in the valve chest space such that rotation of the ball opens and closes communication between the two sides of the valve body, the passage in the ball having a large aperture at a first end of the passage and a small aperture at a second end of the passage; and
a first and a second seat carrier disposed between the two sides of the valve body and the large and small apertures of the ball, the second seat carrier having a second seat carrier passage through which the small aperture of the ball is communicable with one of the two sides of the valve body, the second seat carrier passage having a second seat carrier passage aperture substantially the same size as the small aperture of the ball, the first seat carrier having a first seat carrier passage through which the large aperture of the ball is communicable with one of the two sides of the valve body,
a first communicating portion being provided at the first end of the passage by the large aperture and communicating with the passage and the valve chest space, when the ball is rotated to open communication between the two sides of the valve body, a second communication portion being provided at the second end of the passage by the small aperture and communicating with the passage and the valve chest space when the ball is rotated to open communication between the two sides of the valve body.

5. A ball valve as set forth in claim 4, wherein the first and second communicating portions are formed as grooves.

6. A ball valve as set forth in claim 4, wherein a sectional shape of the passage provided in the ball is a lateral trapezoid narrowed toward the small aperture of the ball.

7. A ball valve as set forth in claim 4, wherein a sectional shape of the passage provided in the ball is formed in such a manner that the large and small of the ball are rectangular and an intermediate portion connecting the large and small apertures of the ball is a lateral trapezoid.

8. A ball valve as set forth in claim 4, wherein the communicating portions provided at the first end of the passage by the large aperture of the ball are formed so as to communicate with the passage of the first seat carrier at the first end of the passage by the large aperture of the ball when the ball is rotated to close communication between the two sides of the valve body.

9. A ball valve as set forth in claim 4, wherein the communicating portions provided at the second end of the passage by the small aperture of the ball are formed so as to communicate with the passage of the second seat carrier at the second end of the passage by the small aperture of the ball when the ball is rotated to close communication between the two sides of the valve body.

10. A ball valve as set forth in claim 4, further comprising a stem flange;
   the ball being further formed with a ball groove for receiving the stem flange, the stem flange forming, with the ball groove, a flange groove,
   a communicating hole being provided at the approximate center portion of the passage in the ball and communicating with the valve chest space through the flange groove.

11. A ball valve as set forth in claim 4, wherein the communicating portions are holes.

* * * * *